US007431099B2

(12) United States Patent
Thompson

(10) Patent No.: US 7,431,099 B2
(45) Date of Patent: Oct. 7, 2008

(54) AUTOMOTIVE ONBOARD FIRE SUPPRESSION SYSTEM RESERVOIR WITH DISCHARGE PORT CONTROLLED BY PILOTED SPOOL VALVE

(75) Inventor: Robert Thompson, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/609,915

(22) Filed: Dec. 13, 2006

(65) Prior Publication Data

US 2007/0084611 A1 Apr. 19, 2007

Related U.S. Application Data

(63) Continuation-in-part of application No. 10/907,134, filed on Mar. 22, 2005, now Pat. No. 7,198,111.

(51) Int. Cl.
*A62C 35/00* (2006.01)
*A62C 3/07* (2006.01)
*B05B 9/04* (2006.01)
*F16K 31/12* (2006.01)

(52) U.S. Cl. ............................ 169/9; 169/62; 239/373; 137/491

(58) Field of Classification Search ..................... 169/9, 169/62, 5, 16, 54, 61, 71, 84, 85; 137/491; 239/373, 172, 569, 570, 583
See application file for complete search history.

(56) References Cited

U.S. PATENT DOCUMENTS 3,228,474 A * 1/1966 Huthsing, Jr. ................ 169/85
4,132,271 A 1/1979 Mikaila
4,194,572 A * 3/1980 Thery et al. .................... 169/66
5,129,386 A 7/1992 Meister
5,590,718 A 1/1997 Bertossi
5,613,564 A 3/1997 Rhines
5,762,145 A 6/1998 Bennett
5,808,541 A 9/1998 Golden
5,918,681 A 7/1999 Thomas
5,934,379 A 8/1999 Ostlyngen et al.
5,954,138 A * 9/1999 Gabriel ........................ 169/20
5,960,888 A 10/1999 Moore, Sr.
5,992,528 A 11/1999 Parkinson et al.
6,164,383 A 12/2000 Thomas
6,352,121 B1 3/2002 Pitell et al.
6,981,555 B2 8/2003 Smith et al.
6,702,033 B1 * 3/2004 Mitchell et al. ............... 169/85
2004/0084193 A1 5/2004 Tseng
2004/0089347 A1 * 5/2004 Cavagna ..................... 137/491
2004/0226726 A1 11/2004 Holland et al.

* cited by examiner

*Primary Examiner*—Darren W Gorman
(74) *Attorney, Agent, or Firm*—Dickinson Wright PLLC; Ray Coppiellie; Frank MacKenzie

(57) ABSTRACT

An automotive vehicle includes a vehicle body and at least one reservoir containing a fire suppressant agent. A distribution system receives the fire suppression agent from the reservoir and conducts the agent to at least one location about the vehicle's body in response to the determination by a sensor system and controller that the vehicle has been subjected to a significant impact. The reservoir includes a discharge port controlled by a piloted spool valve actuated by pressure generated by a propellant device.

8 Claims, 9 Drawing Sheets

AUTOMOTIVE ONBOARD FIRE SUPPRESSION SYSTEM RESERVOIR WITH DISCHARGE PORT CONTROLLED BY PILOTED SPOOL VALVE

RELATED APPLICATIONS

This application is a continuation-in-part of U.S. patent application Ser. No. 10/907,134, filed Mar. 22, 2005.

BACKGROUND OF THE INVENTION

1. Field of the Invention

The present invention relates to an automotive vehicle having an onboard apparatus for suppressing a vehicle fire.

2. Disclosure Information

Police vehicles are subject to increased exposure to collisions, particularly high-speed rear-end collisions, arising from the need for police officers to stop on the shoulders, or even in the traffic lanes, of busy highways. Unfortunately, other motorists are known to collide with police vehicles employed in this manner. These accidents can compromise the fuel system on any vehicle and may cause fires. The present system is designed to suppress the spread of, or potentially, to extinguish such a fire. U.S. Pat. No. 5,590,718 discloses an anti-fire system for vehicles in which a number of fixed nozzles are furnished with a fire extinguishing agent in response to an impact sensor. The system of the '718 patent suffers from a problem in that the fixed nozzles are not suited to the delivery of the extinguishing agent at ground level. Also, the '718 patent uses a valving system which could become clogged and therefore inoperable. U.S. Pat. No. 5,762,145 discloses a fuel tank fire protection device including a powdered extinguishing agent panel attached to the fuel tank. In general, powder delivery systems are designed to prevent ignition of fires and are deployed upon impact. As a result, the powder may not be able to follow the post-impact movement of the struck vehicle and may not be able to prevent the delayed ignition or re-ignition of a fire.

The present fire suppression system provides significant advantages, as compared with prior art vehicular fire suppression systems.

SUMMARY OF THE INVENTION

According to an aspect of the present invention, an onboard fire suppression system for an automotive vehicle includes at least one reservoir containing a fire suppressant agent and a propellant which is operatively associated with the reservoir and which expels the fire suppressant agent from the reservoir, as directed by a system controller. A distribution system receives fire suppression agent expelled from the reservoir and distributes the depressant agent in at least one location external to a vehicle. A spool valve, located between the reservoir and the distribution system, controls a flow of suppressant agent from the reservoir to the distribution system. The spool valve is responsive to fluid pressure within the reservoir and prevents suppression agent from flowing into the distribution system unless the fluid pressure within the reservoir exceeds a predetermined threshold.

In a preferred embodiment, a distribution system may include at least one feeder conduit attached to the reservoir and at least one suppressant nozzle attached to the feeder conduit.

According to another aspect of the present invention, the present spool valve includes a valve body and a valve seat formed in the valve body. A control chamber is also formed in the valve body. A shuttle is positioned in the valve body for sliding movement, with the shuttle including a flow control pintle mounted upon the first end of a valve stem, with the flow control pintle cooperating with the valve seat to control flow through the spool valve. A control piston is mounted within a control chamber upon a second end of the valve stem. The control piston moves the flow control pintle to an open position when a pilot valve mounted within a control passage extending from the reservoir to the control chamber allows fluid to flow from the reservoir to the control chamber, so as to cause the control piston to slidably move the shuttle. Of course, because the flow control pintle is attached to the shuttle, movement of the control piston cause the flow control pintle to move to an open position. The spool valve is calibrated so that opening of the flow control pintle will occur only if the pressure within the reservoir exceeds a predetermined threshold pressure.

According to another aspect of the present invention, the valve stem preferably comprises a generally cylindrical member, with a control passage comprising an axially cored passage having a valve seat upon which a pilot valve element is biased in a normally closed position. The pilot valve preferably comprises a spring-loaded poppet mounted within the control passage.

It is an advantage of the present fire suppression system that a precise discharge pressure may be tuned through the use of appropriate resilient elements, such as springs, associated with a control piston and pilot valve mounted within the present discharge control valve.

Other advantages, as well as features and objects of the present invention will become apparent to the reader of this specification.

BRIEF DESCRIPTION OF THE DRAWINGS

FIG. 12 shows the inventive piloted spool valve in a closed position.

DETAILED DESCRIPTION OF THE PREFERRED EMBODIMENT

Figure 1:
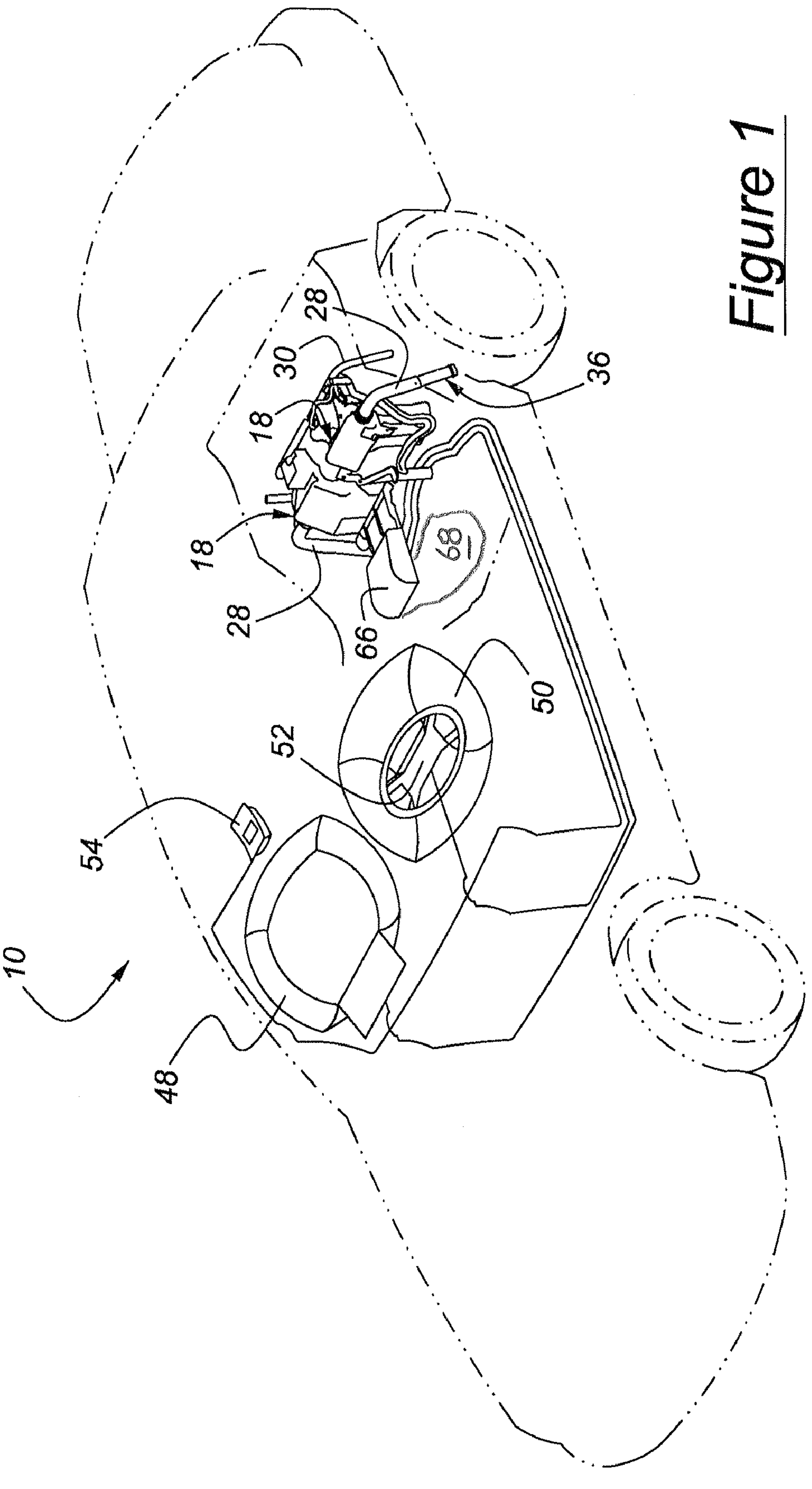
FIG. 1 is a ghost perspective view of an automotive vehicle having a fire suppression system according to the present invention.

As shown in FIG. 1, vehicle 10 has a passenger airbag restraint 48 and a driver's airbag restraint 50 mounted adjacent steering wheel 52. A fire suppression system includes controller 66 which is mounted upon floor pan 68 of vehicle 10, and reservoirs 18 which are mounted under floor pan 68 in the so-called kick-up area adjoining the rear axle of vehicle 10. Those skilled in the art will appreciate in view of this disclosure that additional passenger restraint devices, such as seat belt pretensioners and side airbags, may be installed in a vehicle and controlled at least in part by, or in conjunction with, controller 66.

Figure 2:
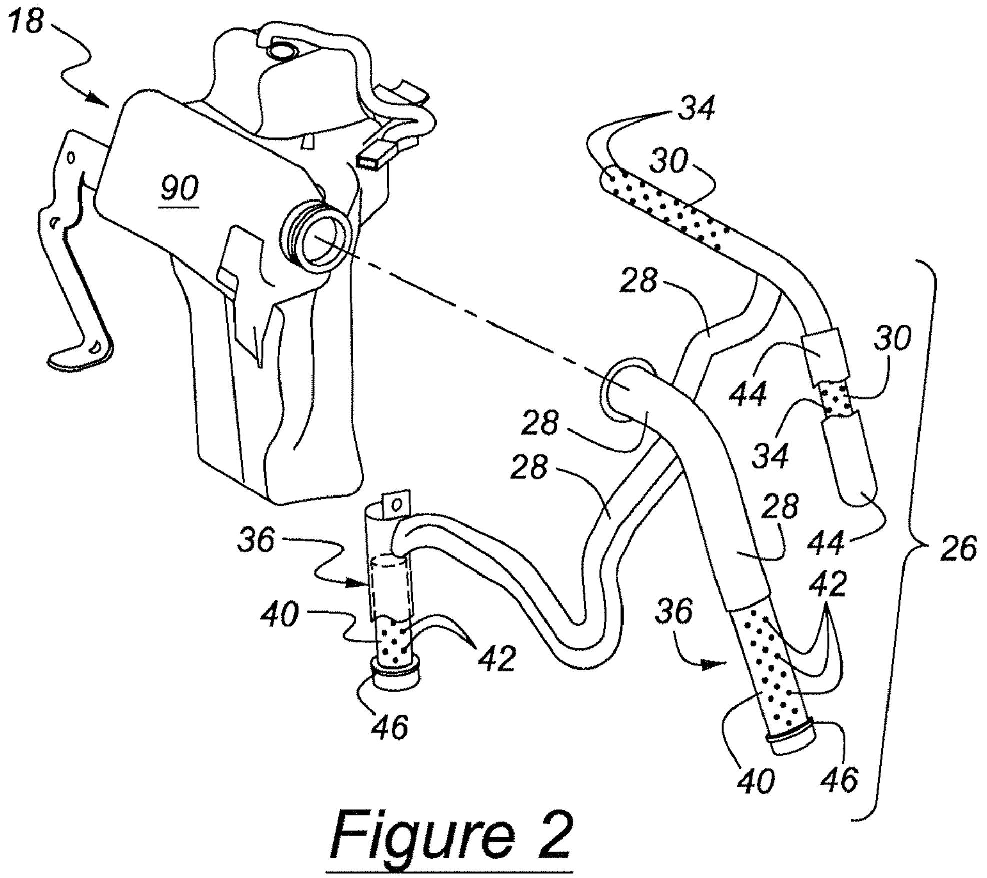
FIG. 2 is an exploded perspective view of a portion of a fire suppression system according to the present invention.
Figure 8:
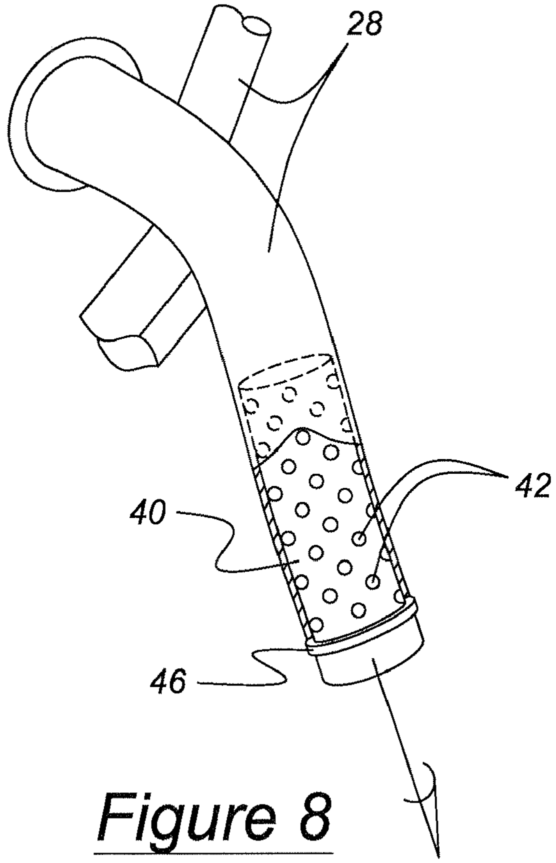
FIG. 8 is a perspective view of a variable geometry fire suppression agent nozzle according to one aspect of the present invention.

FIG. 1 shows not only reservoirs 18 but also a portion of right and left side fire suppression conduits 28, as well as fixed geometry nozzles 30 and variable geometry nozzles 36. As seen in FIG. 1, variable geometry nozzles 36 project downwardly to allow fire suppression agent to be expelled from reservoirs 18 and placed at a low angle to the ground surface the vehicle is operating upon. This mode of operation is possible because variable geometry nozzles 36 are, as shown in FIG. 2, telescopingly extensible. This telescoping feature, which is shown in greater detail in FIG. 8, is produced by a sliding spray head, 40, which is slidingly engaged with conduit 28 such that gas pressure within conduit 28 forces spray head 40 downwardly into its extended position, causing fire suppression agent 22 to be discharged through a number of holes 42 formed in spray head 40. As shown in FIG. 2, at least two variable geometry nozzles 36 may be employed with single reservoir 18, along with at least two fixed nozzles 30 which are spray bars each having a number of orifices 34. While in their normally closed state, variable geometry nozzles 36 are liquid-tight by virtue of seals 46, which are interposed between an end of each of spray heads 40 and the corresponding ends of conduits 28. In a preferred embodiment, seals 46 comprise elastomeric boots attached to an outer surface of conduit 28. Seals 46 are simply sheared by the deploying spray head 40 when the present system is discharged. Fixed nozzles 30 are also rendered liquid-tight by covers 44, which are simply blown off when the present system is discharged. The sealing of nozzles 30 and 36 is important, because this prevents the ingress of road splash, which could block the system in sub-freezing weather or cause corrosion or blockage due to mud or other foreign matter.

Figure 7:
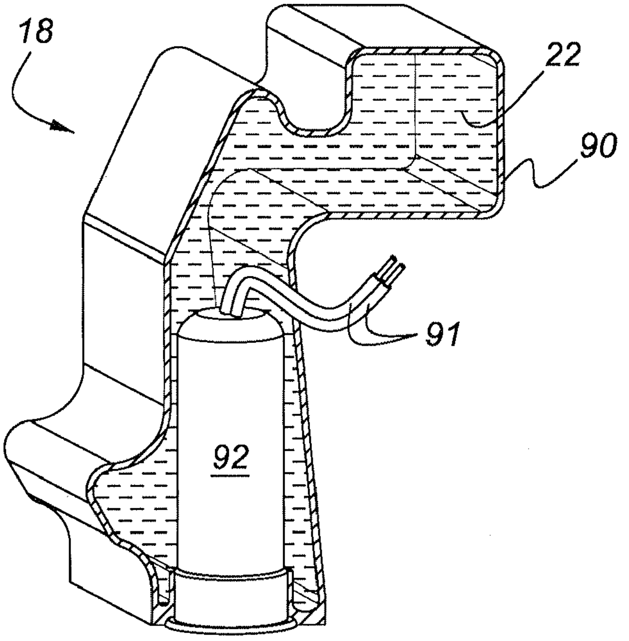
FIG. 7 is a cutaway perspective view of a fire suppression agent reservoir according to one aspect of the present invention.

Additional details of reservoir 18 are shown in FIG. 7. Tank 90 contains approximately 1.5 L of fire suppression agent 22, and a propellant 92. Propellant 92 includes two squibs (not shown) which are activated simultaneously by controller 66 via lines 91 so as to release a large amount of gas, forcing fire suppressant agent 22 from tank 90 and into distribution system 26, including conduit 28 and the various fixed and variable geometry nozzles. A preferred propellant, marketed by Primex Aerospace Company as model FS01-40, is a mixture including aminotetrazole, strontium nitrate, and magnesium carbonate. This is described in U.S. Pat. No. 6,702,033, which is hereby incorporated by reference into this specification.

Those skilled in the art will appreciate in view of this disclosure that other types of propellants could be used in the present system, such as compressed gas canisters and other types of pyrotechnic and chemical devices capable of creating a gas pressure force in a vanishingly small amount of time. Such propellants may be mounted either within a reservoir with the fire suppressant agent, or externally thereto. Moreover, fire suppressant agent 22, which preferably includes a water-based solution with hydrocarbon surfactants, fluorosurfactants, and organic and inorganic salts sold under the trade name LVS Wet Chemical Agent® by Ansul Incorporated, could comprise other types of agents such as powders or other liquids, or yet other agents known to those skilled in the art and suggested by this disclosure. If two reservoirs 18 are employed with a vehicle, as is shown in FIG. 1, all four squibs will be deployed simultaneously.

Figure 4:
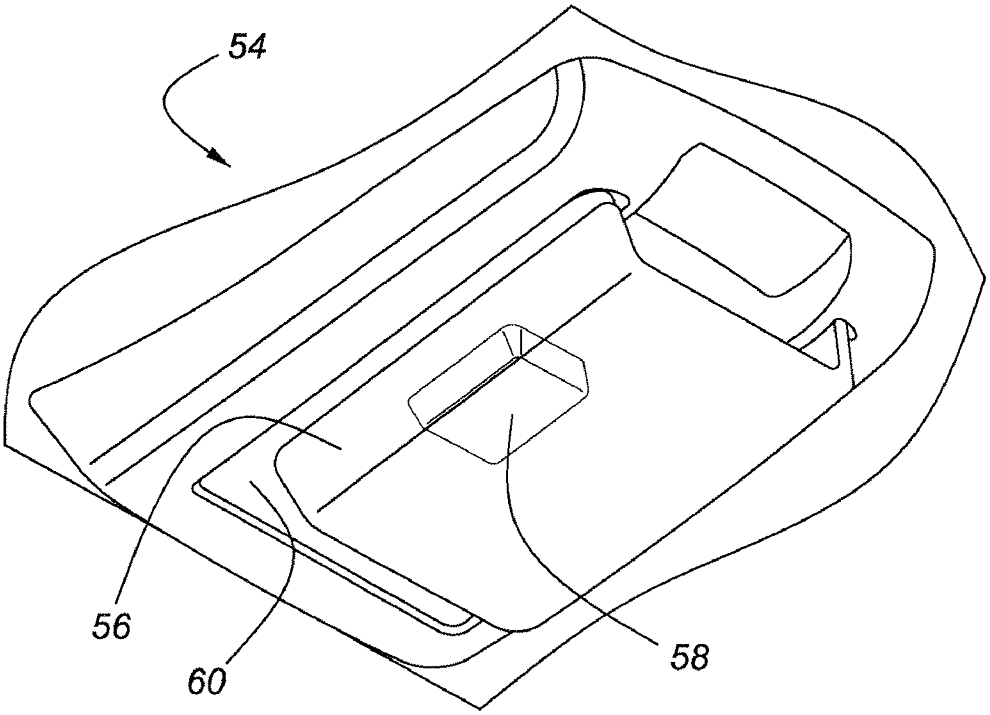
FIG. 4 is a perspective view of a manually activatable switch used with a fire suppression system according to the present invention.

FIG. 4 shows manually activatable switch 54 for use with the present system. As shown in FIG. 1, switch 54 may be advantageously located on the headliner of vehicle 10 between the sun visors, or at any other convenient position. To use this switch 54, hinged clear cover 56 is first opened by pressing on cover 56. Thereafter, the fire suppression system may be triggered by manually pressing pushbutton 58. If the vehicle occupants are not disposed to release cover 56, the system may be triggered by merely sharply depressing cover 56, thereby closing contacts (not shown) contained within platform 60.

Figure 3:
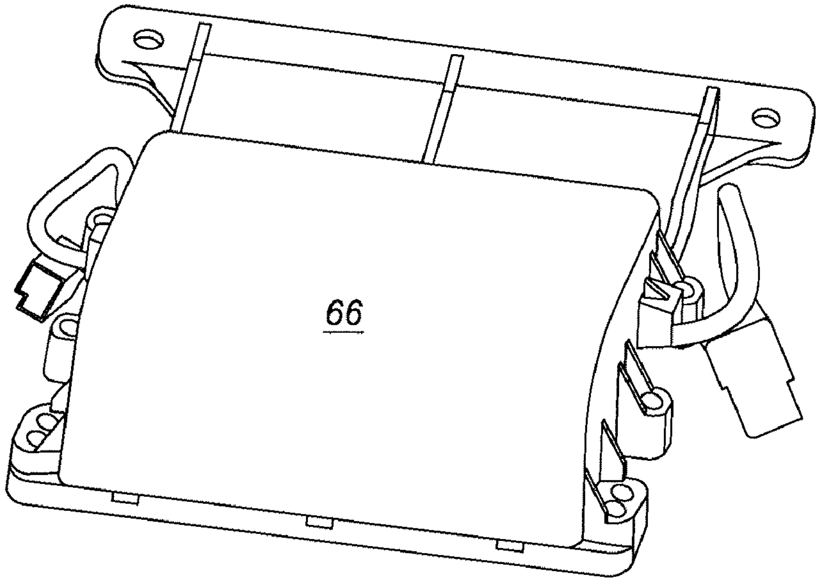
FIG. 3 is a perspective view of a control module used with a system according to the present invention.
Figure 5:
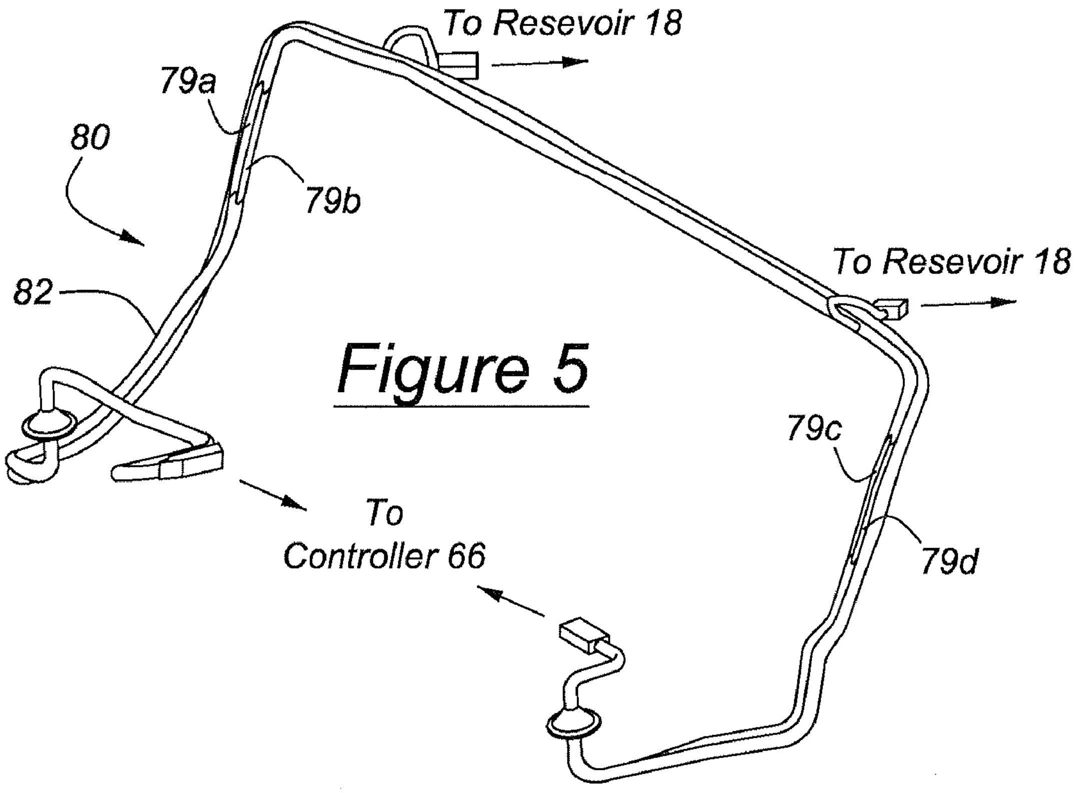
FIG. 5 illustrates a portion of a wiring harness used with the present system.

Because the present system is intended for use when the vehicle has received a severe impact, controller 66, which is shown in FIG. 3, contains a redundant power reserve or supply, which allows operation of the fire suppression system for about nine seconds, even if controller 66 becomes isolated from the vehicle's electrical power supply. Wiring harness 80, as shown in FIG. 5, is armored, and has a para-aramid fiber inner sheath, 82, of about 2 mm in thickness, which helps to shield the conductors within harness 80 from abrasion and cutting during a vehicle impact event. This para-aramid fiber is sold under the trade name KEVLAR® by the DuPont Company. This armoring helps to assure that communication between controller 66 and reservoirs 18 remains in effect during an impact event. Post-impact communications are further aided by redundancy in the control system. Specifically, four independent sets of primary conductors, 79*a-d*, extend from controller 66 to reservoirs 18 protected by sheath 82. Moreover, an H-conductor, shown at 81 in FIG. 5, extends between reservoirs 18. Thus, if one or both of the primary conductors 79*a-b*, or 79*c-d*, extending to one of reservoirs 18 should become severed, H-conductor 81 will be available to carry the initiation signal from the undamaged lines to both of reservoirs 18.

Figure 9:
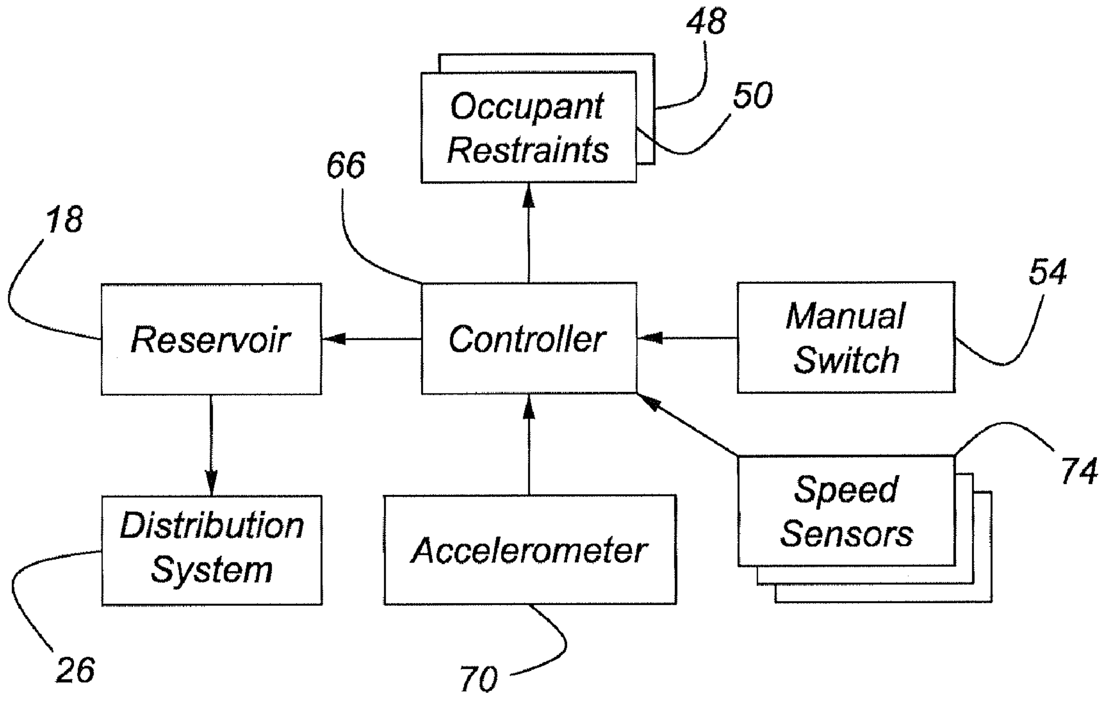
FIG. 9 is a block diagram of a fire suppression system and with additional components for occupant restraint according to one aspect of the present invention.

As noted above, an important feature of the present invention resides in the fact that the control parameters include not only vehicle impact, as measured by an accelerometer such as that shown at 70 in FIG. 9, but also vehicle speed, as measured by means of speed sensors 74, also shown in FIG. 9. Speed sensors 74 may advantageously be existing sensors used with an anti-lock braking system or vehicle stability system. Alternatively, speed sensors 74 could comprise a global positioning sensor or a radar or optically based ground-sensing system. Accelerometer 70, as noted above, could be used with a conventional occupant restraint airbag system, thereby maximizing use of existing systems within the vehicle. Advantageously, accelerometer 70 may be an amalgam of two or more accelerometers having differing sensing ranges. Such arrangements are known to those skilled in the art and suggested by this disclosure. At least a portion of the various sensors could either be integrated in controller 66 or distributed about vehicle 10.

Figure 6:
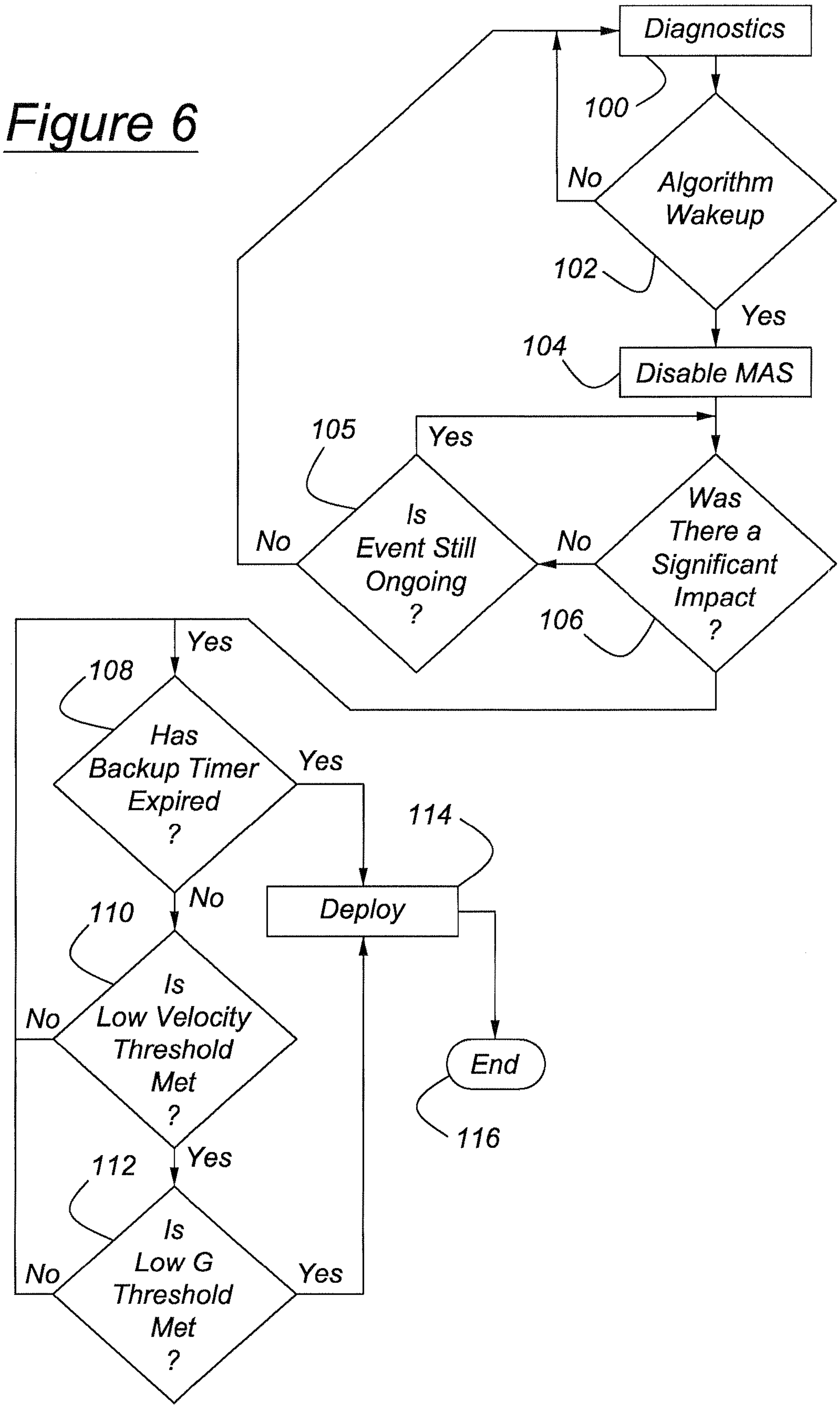
FIG. 6 is a flowchart showing a portion of the logic used to control a system according to the present invention.

FIG. 6 shows a sequence which is used according to one aspect of the present invention for activating a release of fire suppressant agent.

Beginning at block 100, controller 66 performs various diagnostics on the present system, which are similar to the diagnostics currently employed with supplemental restraint systems. For example, various sensor values and system resistances will be evaluated on a continuous basis. Controller 66 periodically moves to block 102, wherein the control algorithm will be shifted from a standby mode to an awake mode in the event that a vehicle acceleration, or, in other words, an impact, having a magnitude in excess of a relatively low threshold is sensed by accelerometer 70. Also, at block 102 a backup timer will be started. If the algorithm is awakened at block 102, controller 66 disables manually activatable switch 54 at block 104 for a predetermined amount of time, say 150 milliseconds. This serves to prevent switch 54 from inadvertently causing an out-of-sequence release of fire suppression agent. Note that at block 104, a decision has not yet been made to deploy fire suppression agent 22 as a result of a significant impact.

At block 106, controller 66 uses output from accelerometer 70 to determine whether there has been an impact upon vehicle 10 having a severity in excess of a predetermined threshold impact value. Such an impact may be termed a significant, or "trigger", impact. If an impact is less severe than a trigger impact, the answer at block 106 is "no", and controller 66 will move to block 105, wherein an inquiry is made regarding the continuing nature of the impact event. If the event has ended, the routine moves to block 100 and continues with the diagnostics. If the event is proceeding, the answer at block 105 is "yes", and the routine loops to block 106.

If a significant impact is sensed by the sensor system including accelerometer 70 and controller 66, the answer at block 106 will be "yes." If such is the case, controller 66 moves to block 108 wherein the status of a backup timer is checked. This timer was started at block 102.

Once the timer within controller 66 has counted up to a predetermined, calibratable time on the order of, for example, 5-6 seconds, controller 66 will cause propellant 92 to initiate delivery of fire suppressant agent 22, provided the agent was not released earlier. Propellant 92 is activated by firing an electrical squib so as to initiate combustion of a pyrotechnic charge. Alternatively, a squib may be used to pierce, or otherwise breach, a pressure vessel. Those skilled in the art will appreciate in view of this disclosure that several additional means are available for generating the gas required to expel fire suppressant agent 22 from tank 90. Such detail is beyond the scope of this invention. An important redundancy is supplied by having two squibs located within each of tanks 90. All four squibs are energized simultaneously.

The velocity of the vehicle 10 is measured at block 110 using speed sensors 74, and compared with a low velocity threshold. In essence, controller 66 processes the signals from the various wheel speed sensors 74 by entering the greatest absolute value of the several wheel speeds into a register. This register contains both a weighted count of the number of samples below a threshold and a count of the number of samples above the threshold. When the register value crosses a threshold value, the answer at block 110 becomes "yes." In general, the present inventors have determined that it is desirable to deploy fire suppression agent 22 prior to the vehicle coming to a stop. For example, fire suppression agent 22 could be dispersed when the vehicle slows below about 15 kph.

At block 112, controller 66 enters a measured vehicle acceleration value into a second register. Thereafter, once the acceleration register value decays below a predetermined low g threshold, the answer becomes "yes" at block 112, and the routine moves to block 114 and releases fire suppressant agent 22. In essence, a sensor fusion method combines all available sensor information to verify that the vehicle is approaching a halt. The routine ends at block 116. Because the present fire suppression system uses all of the available fire suppression agent 22 in a single deployment, the system cannot be redeployed without replacing at least reservoirs 18.

FIG. 6 does not include the activation of occupant restraints 48 and 50, it being understood that known control sequences, having much different timing constraints, may be employed for this purpose. In point of contrast, the low velocity threshold allows the present system to deliver the fire suppression agent while the vehicle is still moving, albeit at a very low velocity. This prevents the rear wheels of the vehicle from shadowing, or blocking dispersion of fire suppressant agent 22. Also, in many cases, a vehicular fire may not become well-established until the vehicle comes to a halt.

Figure 10:
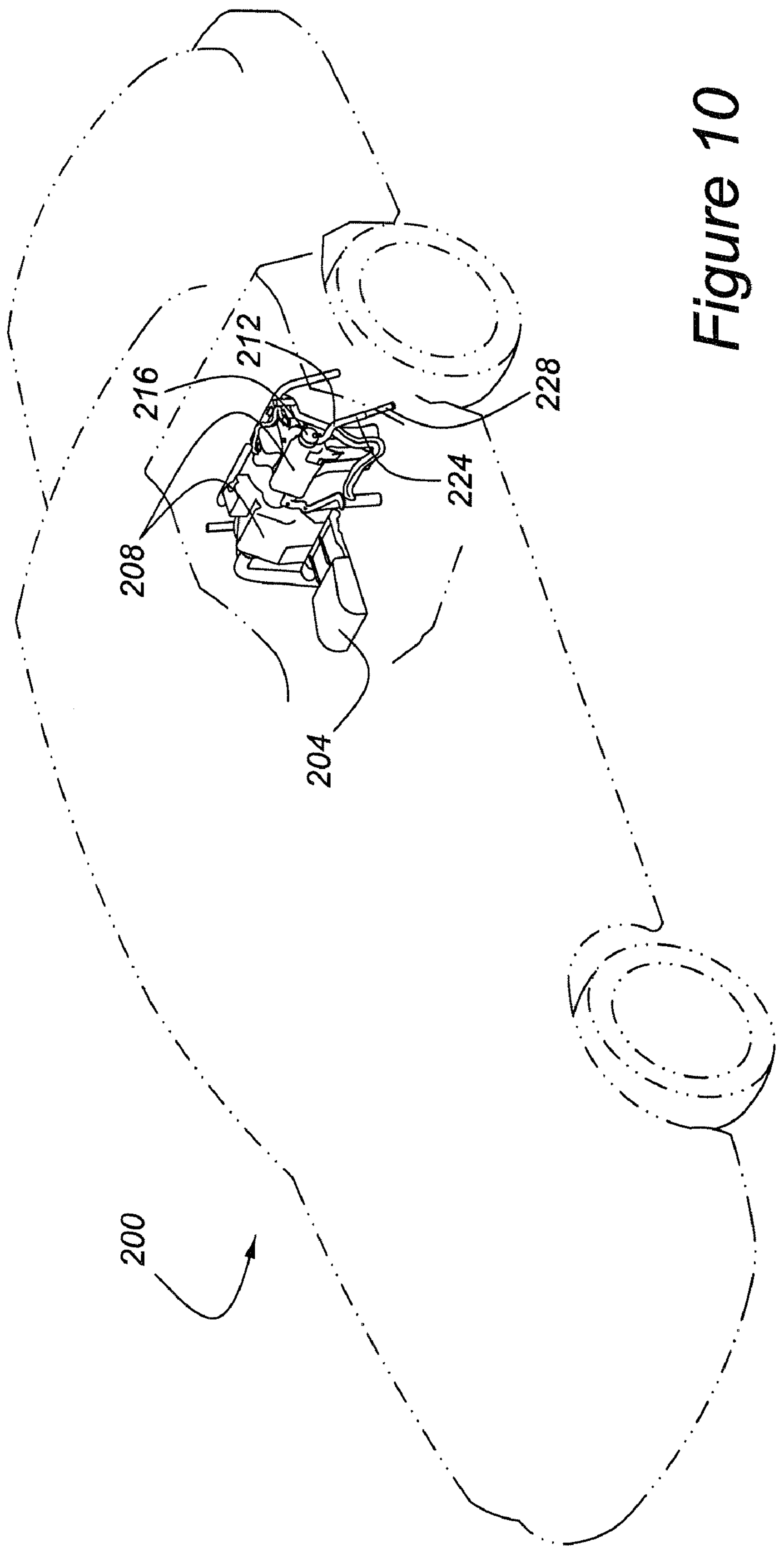
FIG. 10 is a perspective view of a vehicle having a fire suppression system with a reservoir having a piloted spool valve for controlling a discharge port according to one aspect of the present invention.
Figure 11:
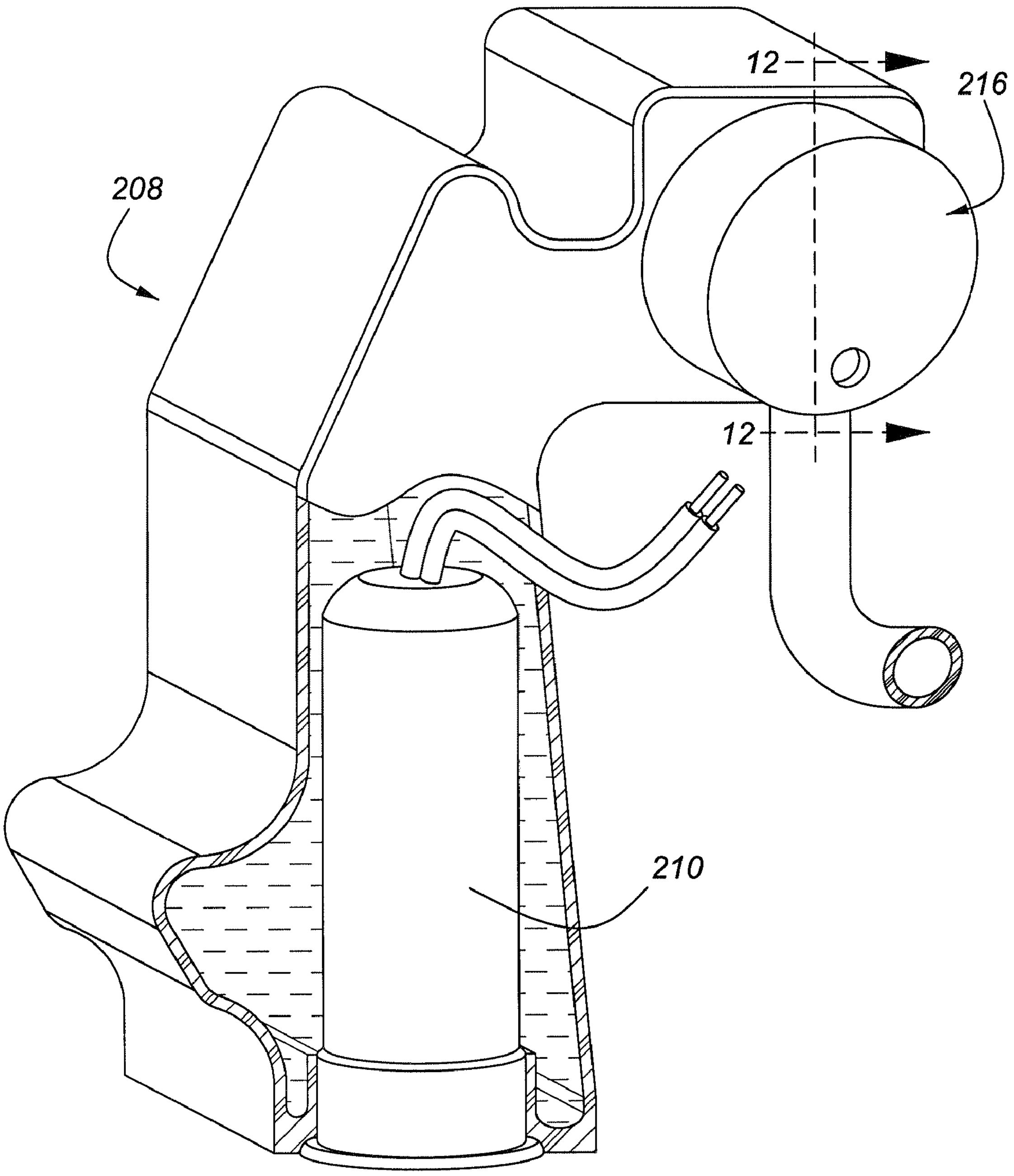
FIG. 11 is a perspective view of a suppression agent reservoir according to one aspect of the present invention.

As shown in FIG. 10, vehicle 200 has a controller, 204, for operating the present onboard fire suppression system. Upon the appropriate command, propellant 210 (shown in FIG. 11) discharges suppressant agent from multiple reservoirs 208. The suppressant distribution system 212 includes at least one feeder conduit 224, and at least one nozzle 228. Propellant 210 may be located either within reservoir 208, or externally thereto.

Spool valve 216 is mounted between distribution system 212 and reservoir 208. The purpose of spool valve 216 is to control the flow of suppressant agent 214 from reservoir 208 to distribution system 212.

Figure 12:
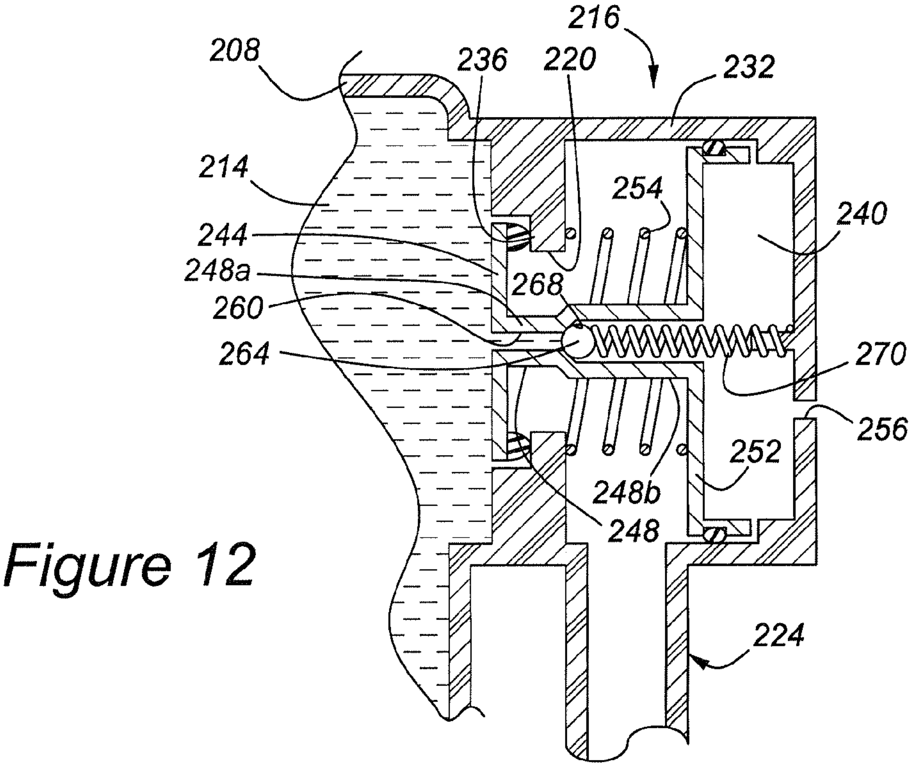
FIG. 12 is a sectional view of a portion of the reservoir of FIG. 11, taken along the line 12-12 of FIG. 11.
Figure 13:
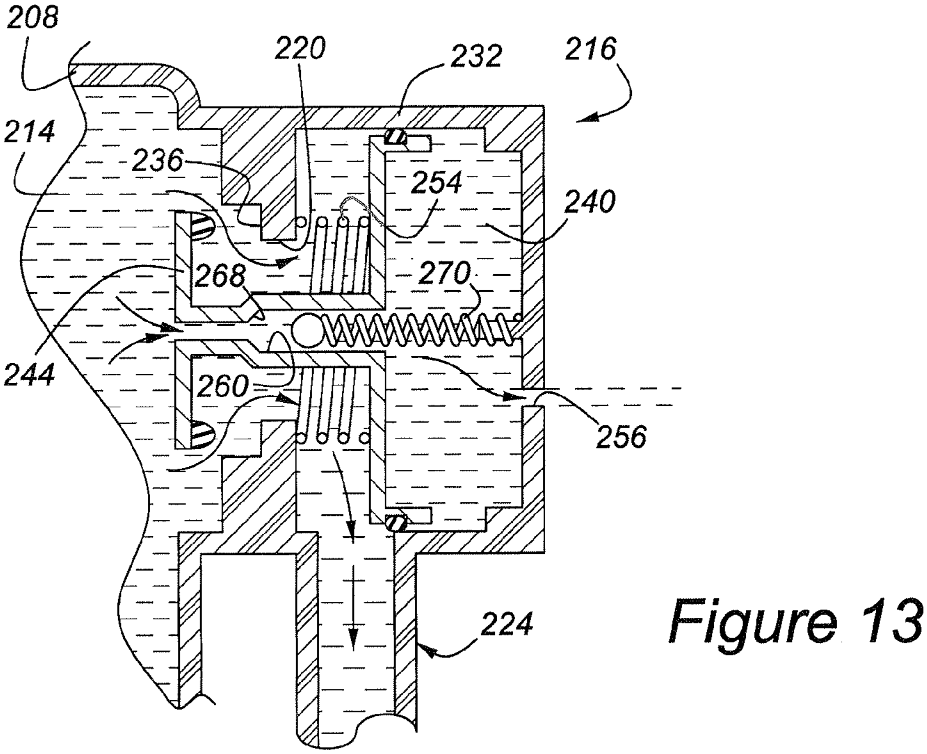
FIG. 13 shows the piloted spool valve of FIG. 12 in an open position.

Operation of spool valve 216 is best understood with references to FIGS. 12 and 13. FIG. 12 shows spool valve 216 in its closed position, with FIG. 13 showing spool valve 216 in an open position which allows discharge of suppressant agent 214 through distribution system 212.

Spool valve 216 includes a valve body, 232, having a discharge port 220. Flow through discharge port 220 is controlled by flow control pintle 244, which is mounted to a first end, 248*a*, of valve spool stem 248. A control piston, 252, is mounted to a second end, 248*b*, of valve spool stem 248. Those skilled in the art will appreciate in view of this disclosure that flow control pintle 244, valve spool stem 248, and control piston 252 may either be unitary, or separate components combined in a single assembly.

During standby operation of the present onboard fire suppression system, flow control pintle 244 is maintained in contact with valve seat 236 by means of compression spring 254, which bears against control piston 252. During standby operation, bleed orifice 256 assures that no pressure will build within a control chamber, 240, which extends between valve body 232 and control piston 252. If, however, propellant 210 is activated, pressure will build rapidly within reservoir 208, and pilot poppet 264, which is located within control passage 260, will be forced off of seat 268 against the force of spring 270 when a predetermined threshold pressure has been reached, and this will allow gas from propellant 210 and/or depressant agent 214 to enter control chamber 240. Although control passage 260 is shown as an axially cored passage within valve spool stem 248, passage 260 may be constructed as a series of drillings or cast passages (not shown) within valve body 232, with pilot poppet 264 being located within such alternative passage.

Because the area of control piston 252 is much greater than the area of flow control pintle 244, the pressure within control chamber 240 will cause control piston 252 to move flow control pintle 244 into the opening direction against the force of spring 254, and, as shown in FIG. 13, agent 214 will be allowed to leave reservoir 208. The operating characteristics of valve 216 may be tuned readily by changing springs 254 and 270.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An onboard fire suppression system for an automotive vehicle, comprising:

at least one reservoir containing a fire suppressant agent;

a propellant, operatively associated with said reservoir, for expelling the fire suppressant agent from the reservoir;

a distribution system for receiving fire suppressant agent expelled from said reservoir and for distributing the suppressant agent in at least one location external to a vehicle; and and a spool valve, located between said reservoir and said distribution system, for controlling a flow of suppressant agent from said reservoir to said distribution system wherein said spool valve comprises:

a valve body;

a valve seat formed in said valve body;

a control chamber formed in said valve body;

a shuttle positioned in said valve body for sliding movement, with said shuttle comprising:

a flow control pintle mounted upon a first end of a valve spool stem, with said flow control pintle cooperating with said valve seat to control flow through the spool valve;

a control piston, mounted within said control chamber upon a second end of said valve spool stem, for moving said flow control pintle to an open position; and a pilot valve, mounted within a control passage extending from said reservoir to said control chamber, for allowing fluid to flow from said reservoir to said control chamber, so as to cause said control piston to slidably move the shuttle, including the flow control pintle, to an open position if the pressure within the reservoir exceeds a predetermined threshold pressure.

2. An onboard fire suppression system according to claim 1, wherein operation of said spool valve is responsive to fluid pressure within said reservoir.

3. An onboard fire suppression system according to claim 2, wherein said spool valve prevents suppressant agent from flowing into said distribution system unless the fluid pressure within the reservoir exceeds a predetermined threshold.

4. An onboard fire suppression system according to claim 1, wherein said distribution system comprises: at least one feeder conduit attached to said reservoir; and at least one suppressant nozzle attached to said at least one feeder conduit.

5. An onboard fire suppression system according to claim 1, wherein said valve stem comprises a generally cylindrical member, with said control passage comprising an axially cored passage having a valve seat upon which a valve element is biased in a normally closed position.

6. An onboard fire suppression system according to claim 5, wherein said valve element is an inwardly opening valve element which is resiliently biased upon said valve seat.

7. An onboard fire suppression system for an automotive vehicle, comprising:

at least one reservoir containing a fire suppressant agent;

a propellant, operatively associated with said reservoir, for expelling the fire suppressant agent from the reservoir;

a distribution system for receiving fire suppressant agent expelled from said reservoir and for distributing the suppressant agent in at least one location external to a vehicle; and a spool valve, located between said reservoir and said distribution system, for controlling a flow of suppressant agent from said reservoir to said distribution system, with said spool valve comprising:

a valve body mounted through a wall of said reservoir;

a valve seat formed in said valve body;

a control chamber formed in said valve body; and a shuttle positioned in said valve body for sliding movement, with said shuttle comprising:

a flow control pintle mounted upon a first end of a valve spool stem, with said flow control pintle cooperating with said valve seat to control flow through the spool valve;

a control piston, mounted within said control chamber upon a second end of said valve spool stem, for moving said flow control pintle to an open position;

a pilot valve, mounted within a control passage extending from said reservoir to said control chamber, for allowing fluid to flow from said reservoir to said control chamber, so as to cause said control piston to slidably move the shuttle, including the flow control pintle, to an open position if the pressure within the reservoir exceeds a predetermined threshold pressure.

8. An onboard fire suppression system according to claim 7, wherein said pilot valve comprises a spring-loaded poppet, and wherein said control passage extends through said valve spool stem from said reservoir to said control chamber.

* * * * *